United States Patent [19]
Daniels

[11] 4,253,634
[45] Mar. 3, 1981

[54] ELECTRIC MOTOR MOUNTING SYSTEM
[75] Inventor: Nicholas R. Daniels, St. Louis, Mo.
[73] Assignee: Emerson Electric Co., St. Louis, Mo.
[21] Appl. No.: 939,336
[22] Filed: Sep. 5, 1978
[51] Int. Cl.³ .............................................. F16M 13/00
[52] U.S. Cl. ....................................... 248/604; 310/91
[58] Field of Search ............... 248/603, 604, 614, 675; 416/244, 500; 310/91

[56] References Cited
U.S. PATENT DOCUMENTS

| | | | |
|---|---|---|---|
| 1,873,343 | 8/1932 | Seyfried | 248/604 |
| 2,096,621 | 10/1937 | Skolfield | 248/604 |
| 2,896,886 | 7/1959 | Slattery et al. | 248/604 |
| 3,317,124 | 5/1967 | Morrill | 248/604 X |
| 3,584,469 | 6/1971 | Butts | 310/91 X |
| 3,773,285 | 11/1973 | Morrill | 416/500 X |
| 3,790,114 | 2/1974 | Italiano | 248/675 |
| 3,830,595 | 8/1974 | Carpenter et al. | 310/91 X |
| 4,145,936 | 3/1979 | Vincent et al. | 416/500 X |
| 4,155,529 | 5/1979 | Maudlin | 248/604 |

FOREIGN PATENT DOCUMENTS
1238344  7/1971  United Kingdom ..................... 248/603

Primary Examiner—J. Franklin Foss
Attorney, Agent, or Firm—Polster, Polster and Lucchesi

[57] ABSTRACT

A mounting system for an electric motor or the like utilizing three, one piece motor mounting brackets made of formed wire and secured to the motor at intervals therearound. The outer ends of the brackets are adapted to be bolted to a support, and the inner ends of the brackets may either be snapped into place on the motor or welded or otherwise rigidly attached to the motor. In certain embodiments of the mounting system, the brackets may be rotated relative to the motor so as to be folded adjacent to the motor for compact packaging of the motor for shipping and may be extended for mounting the motor on the support, and in other embodiments, the brackets may be shipped separately from the motor and then readily installed on the motor prior to installation of the motor.

34 Claims, 15 Drawing Figures

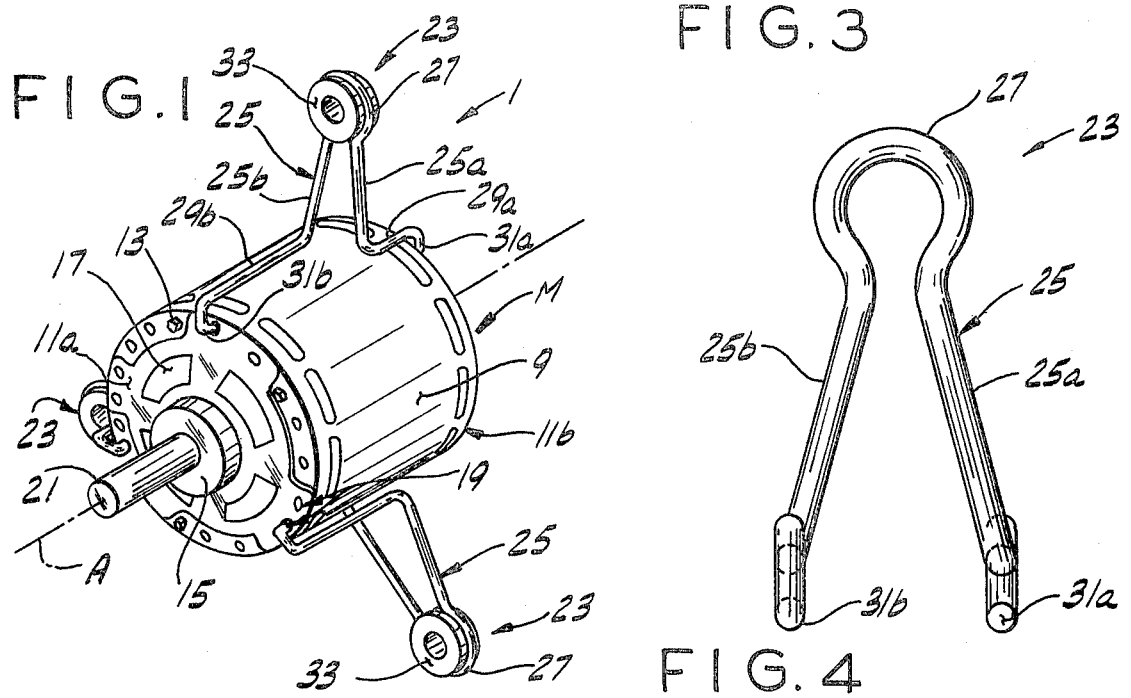
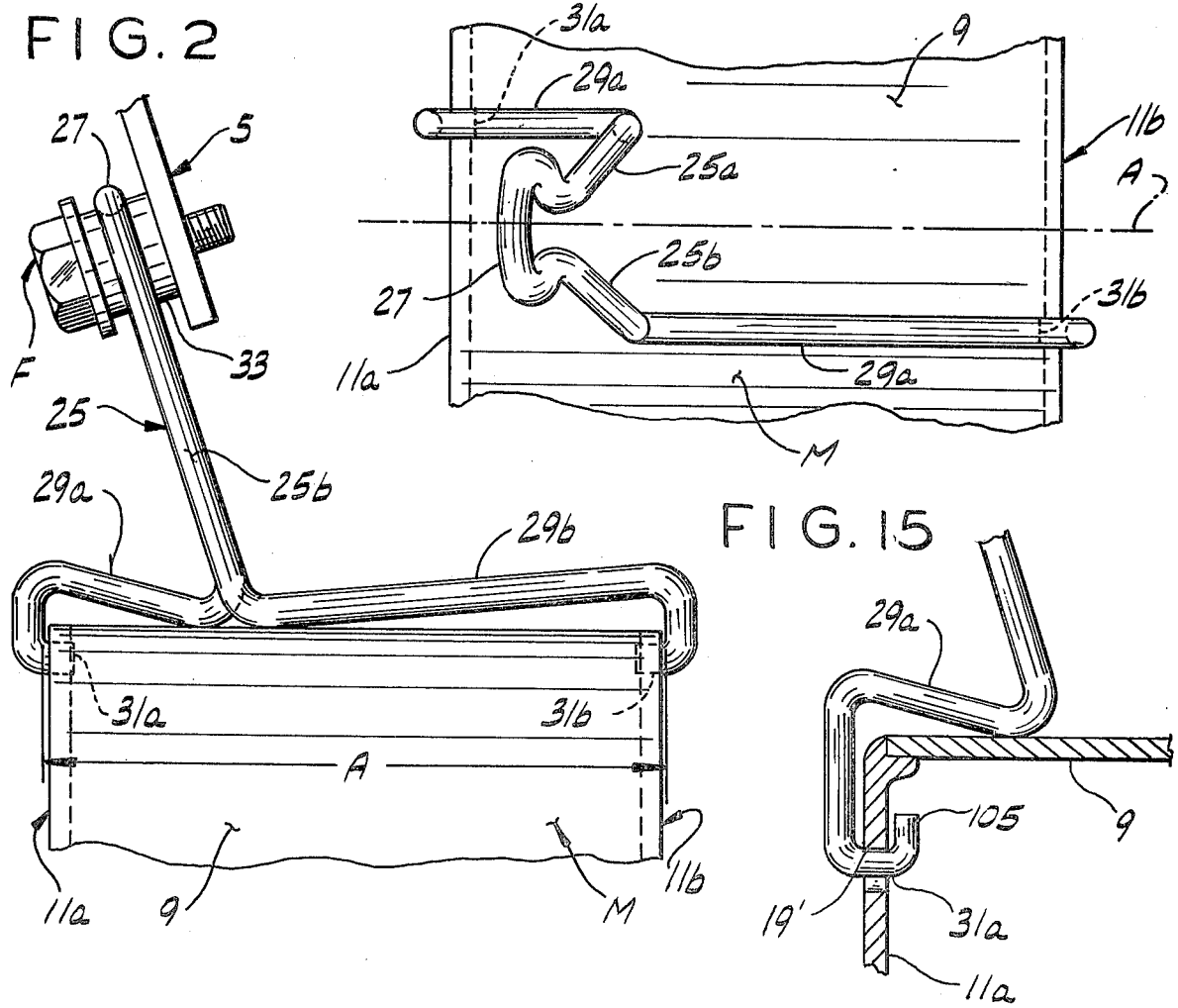

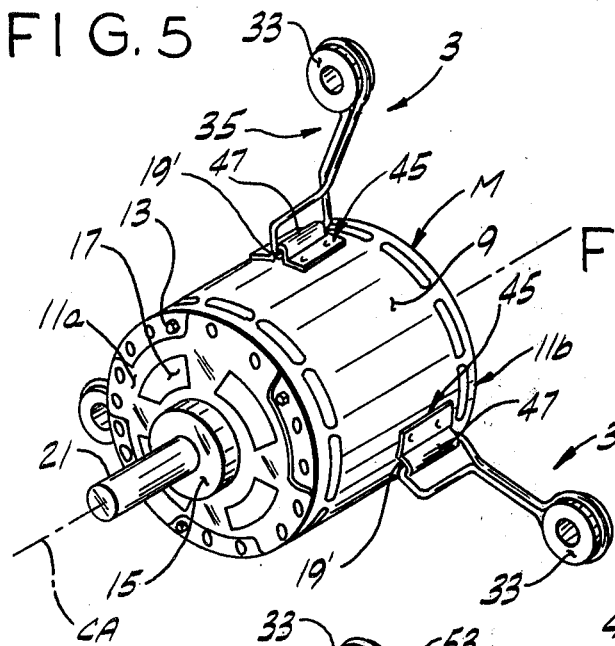
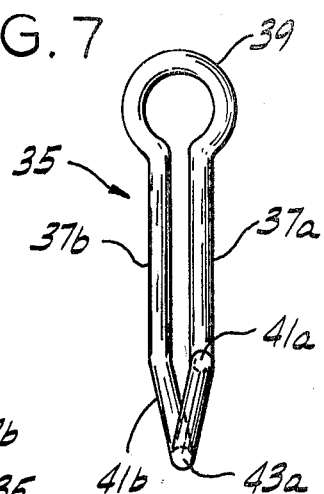
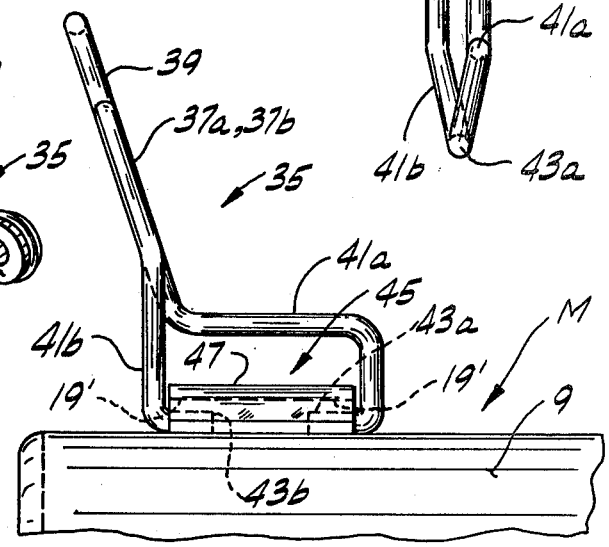
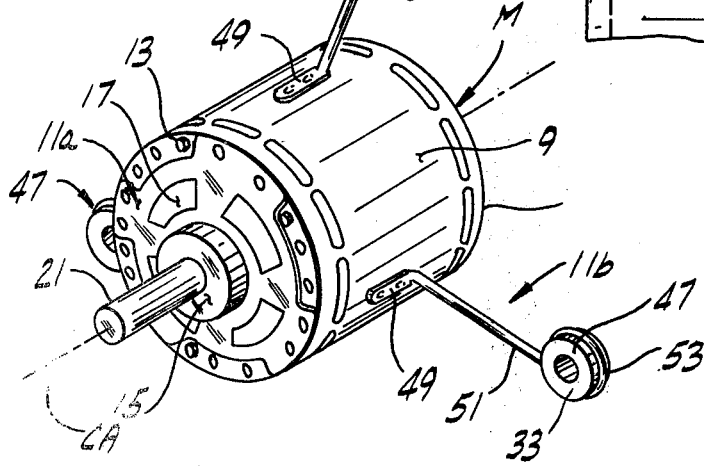
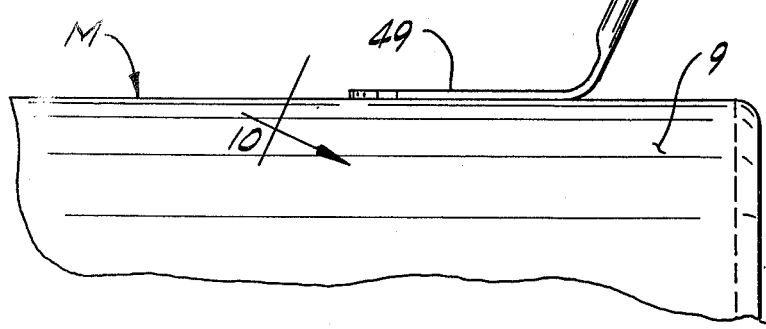
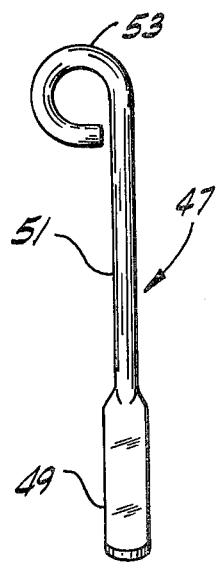

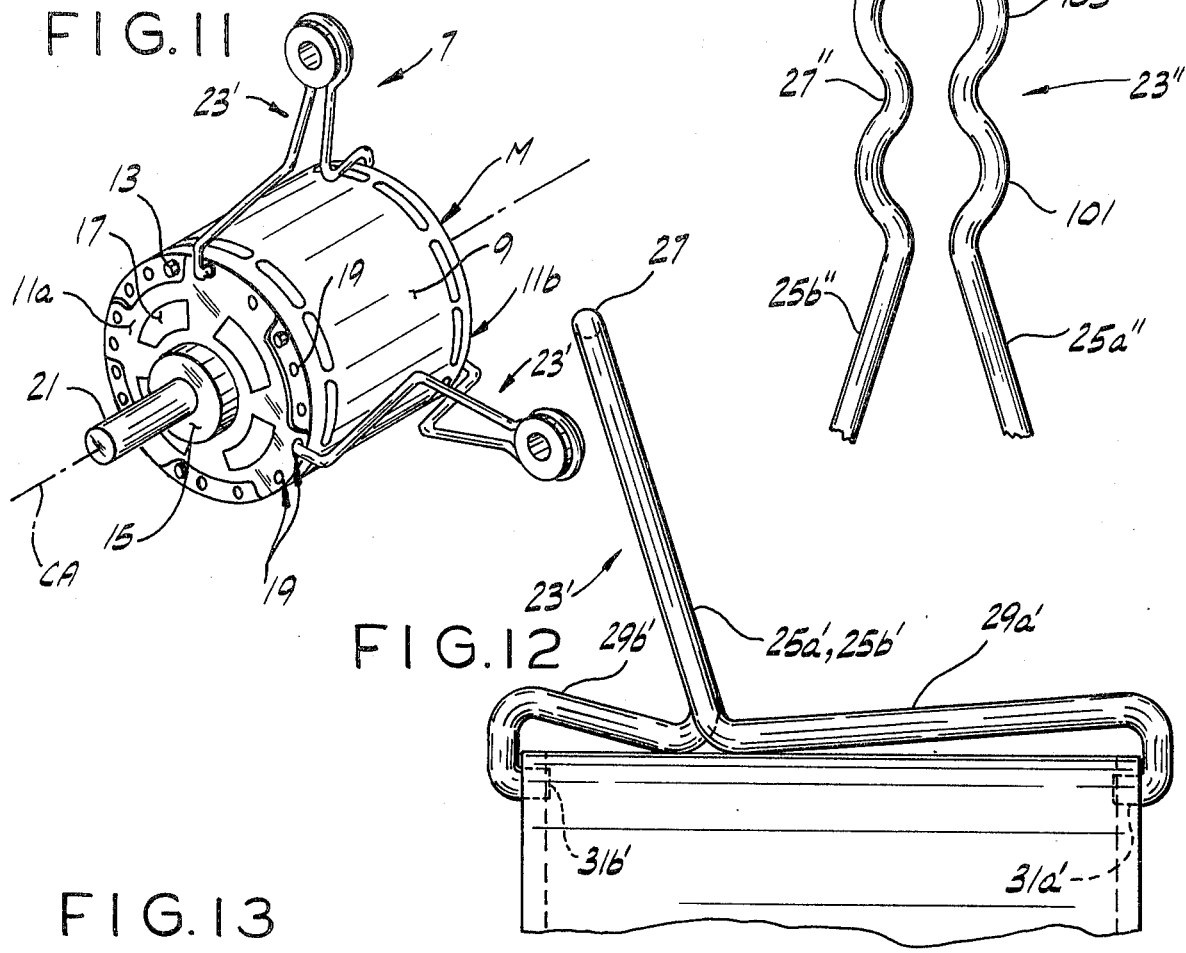
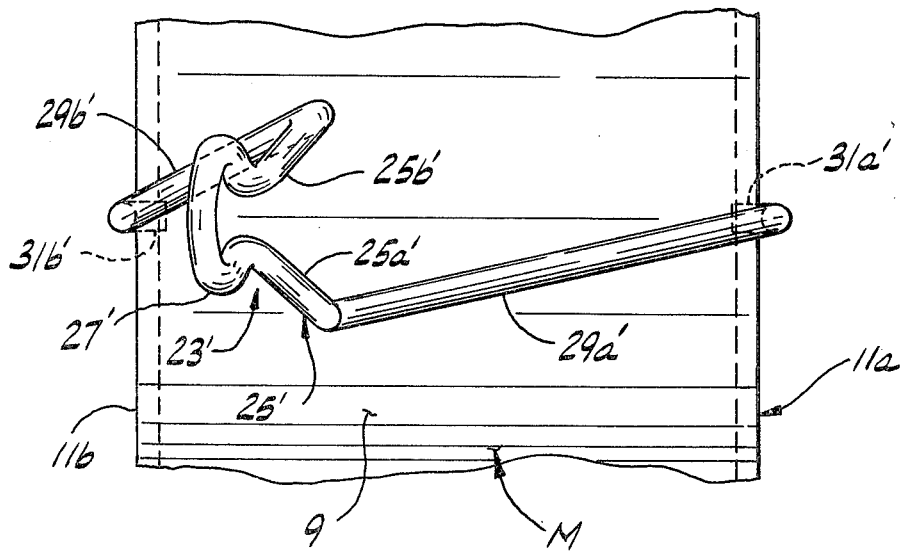

ELECTRIC MOTOR MOUNTING SYSTEM

BACKGROUND OF THE INVENTION

This invention relates to a system of and means for operatively mounting an electric motor or the like on a support, such as to the frame of a furnace in an air moving (e.g., blower) application or on the frame of an electrical appliance. Even more specifically, this invention relates to a system of formed wire brackets for mounting an electric motor.

Generally, a mounting system for an electric motor must, of course, secure the motor to its support so that the reaction forces of the motor during operation of the motor may be transferred to the support. Typically, motors are supplied with rigid stamped steel brackets welded or otherwise rigidly attached to the motor. Upon installation of the motor on a support, these brackets are secured (e.g., bolted) to the support. These brackets are typically secured to the frame of the motor by the motor manufacturer and thus must be shipped with the motor. Not only do these prior mounting brackets take up considerable space during shipping of the motors, but they are subject to being damaged during shipping and may thus render the motor unusable. Also, a special bracket shape or size oftentimes must be provided to mate with different applications even though the same motor is used. Consequently, motor manufacturers must have on hand a wide variety of motors differing only in respect to the various mounting brackets secured thereto.

In certain motor applications, and in particular blower applications, it is desirable that the motor be rigidly mounted so as to substantially prevent axial movement of its output shaft and yet be flexibly mounted in certain other directions (i.e., in rotational direction) so as to absorb shock during operation of the motor and to otherwise cushion the motor. Heretofore, either the motor was attached to a bracket affixed to the motor frame, or, a relatively expensive spring motor mount system was required.

SUMMARY OF THE INVENTION

Among the several objects and features of this invention may be noted the provision of a system of and means for mounting a motor on a support in which the motor mounting brackets allow for compact shipment of the motor and may either be readily installed on the motor just prior to mounting the motor on its support or may be folded next to the motor during shipping and then be readily extended for mounting the motor;

The provision of such a mounting system in which mounting brackets of various sizes and shapes may be readily secured to a motor thus reducing the number of motors that must be supplied or carried in inventory;

The provision of such a mounting system which is infinitely adjustable within a limited range so as to accommodate a virtually infinite range of mounting locations and positions of the motor;

The provision of such a motor mounting system in which the mounting brackets may be readily snapped into place on the motor for securement of the brackets to the motor without the use of even simple hand tools;

The provision of such a motor mounting system in which the mounting brackets are adapted to mate with either an inner or an outer set of fastener receiving holes on the support frame for the motor;

The provision of such a motor mounting system which rigidly restrains a motor against axial movement and yet which permits limited resilient radial and rotational movement of the motor; and The provision of such a motor mounting system which is inexpensive to manufacture, which uses a minimum amount of readily available materials, and which requires no special tooling for manufacture.

Briefly, a system of this invention relates to mounting an electric motor or the like on a support. The motor typically has a central longitudinal axis extending in fore and aft direction. The mounting system comprises a plurality of brackets adapted to be attached to the motor at intervals therearound, each of these brackets being formed of relatively stiff wire or the like and having a body portion extending outwardly from the motor and a loop at the outer end of the bracket. The loop faces in generally fore and aft direction with respect to the motor and is adapted to receive a fastener for securement of the motor to the support. Other objects and features of this invention will be in part apparent and in part pointed out hereinafter.

BRIEF DESCRIPTION OF THE DRAWINGS

FIG. 1 is a perspective view of a conventional electric motor having a first embodiment of the motor mounting system of this invention installed thereon, the system is shown to include three formed wire brackets snapped into place in apertures provided on the end shields of the motor, the brackets being illustrated in their extended mounting positions;

FIG. 2 is an enlarged side elevational view of one of the mounting brackets illustrated in FIG. 1;

FIG. 3 is a right end elevational view of the mounting bracket shown in FIG. 2;

FIG. 4 is a plan view of the mounting bracket shown in FIGS. 2 and 3;

FIG. 5 is a perspective view of an electric motor illustrating another embodiment of the motor mounting system of this invention in which three formed wire brackets are secured to the shell of the motor by means of an attachment plate rigidly attached by welding or other means to the outer surface of the shell;

FIG. 6 is an enlarged side elevational view of one of the formed wire brackets shown in FIG. 5;

FIG. 7 is a right end elevational view of the bracket shown in FIG. 6;

FIG. 8 is a perspective view of an electric motor illustrating still another embodiment of the mounting system of this invention in which three formed wire brackets are welded to the shell of the motor;

FIG. 9 is an enlarged side elevational view of one of the brackets shown in FIG. 8;

FIG. 10 is a view taken along 10—10 of FIG. 9 illustrating further details of the bracket;

FIG. 11 is a perspective view of an electric motor illustrating still another embodiment of the mounting system of this invention in which a plurality of wire brackets is secured to the motor in a manner similar to that illustrated in FIG. 1;

FIG. 12 is an enlarged side elevational view of one of the brackets shown in FIG. 11;

FIG. 13 is a plan view of the bracket shown in FIG. 12;

FIG. 14 is a view similar to FIG. 3 of still another embodiment of a bracket in accordance with this invention; and FIG. 15 is a portion of a side elevational view of a bracket of this invention similar to that shown in FIGS. 1-4 further having a hook-shaped retainer formed on the inner end of the bracket foot.

Corresponding reference characters indicate corresponding parts throughout the several views of the drawings.

DESCRIPTION OF PREFERRED EMBODIMENTS

Referring now to the drawings, various embodiments of the motor mounting system of this invention are indicated in their entirety by reference characters 1, 3, 5, and 7 in FIGS. 1, 5, 8, and 11, respectively, and are shown to be installed on various electric motors M. Generally, motor M may any type of motor, or other dynamoelectric machine, or for that matter any other similar object, which is to be mounted on a support. The motor mounting system of this invention herein shown and described is particularly well-suited for mounting a motor to the support frame or structure S (see FIG. 2) of an electrical appliance, such as to the frame of a furnace, washing machine, clothes dryer, or the like. In particular, the mounting system herein described is well-suited for mounting a blower motor in air moving apparatus, such as furnaces and ventilation systems.

Motor M is shown to have a cylindric outer shell 9 of sheet steel or the like and an end shield 11a or 11b secured to the ends of the shell by means of bolts 13 which extend lengthwise through the motor. As is conventional, each of the end shields shown in the drawings is a rigid, die cast member having a bearing pillow 15 at its center and a plurality of openings 17 therethrough for the circulation of cooling air through the motor. As indicated at 19 in FIGS. 1 and 11, each end shield 11a, 11b has a plurality of apertures formed therein adjacent the outer margins of the end shield for purposes as will appear. As is typical, a shaft 21 is journalled in anti-friction bearings (not shown) disposed within bearing pillows 15 in the end shields. The longitudinal axis of shaft 21 constitutes the central axis CA of the motor which extends in fore and aft direction with respect to the motor and also constitutes the cylindric axis of shell 9.

In general, the mounting system of this invention is herein shown to comprise various embodiments of formed wire mounting brackets adapted to be secured or attached in one fashion or another to motor M for mounting of the motor on support S. These mounting brackets are preferably made from relatively stiff, resilient wire or rod stock. For example, the brackets may be made of ⅛ inch (3 millimeter) diameter steel wire.

Referring to the embodiment of the mounting system indicated at 1 and shown in FIGS. 1-4, three formed wire mounting brackets, as generally indicated at 23, are illustrated. Each of these mounting brackets includes a main body 25 extending generally outwardly with respect to shell 9 of motor M when the brackets are installed on the motor. A loop 27 is provided at the outer end of the main body. As best shown in FIG. 1, brackets 23 are secured to the motor at substantially equal angular intervals (about 120 degree intervals) therearound. Preferably, loops 27 face generally in fore and aft direction with respect to the motor and are further preferably disposed in a plane inclined with respect to a plane perpendicular to longitudinal axis CA of motor M. It will be understood that while the plane of the loop is inclined, as shown in FIG. 2, the loop nevertheless may be said to face generally in fore and aft direction with respect to the motor.

Main body 25 of brackets 23 is constituted by a pair of side-by-side, spaced body portions 25a, 25b. At least one, and preferably both, of these body portions 25a, 25b are shown in FIG. 2 to be coplanar with loop 27, and in FIG. 3, these body portions are shown to angle inwardly toward loop 27 so as to nearly close the bottom portion of the loop. Each body portion 25a, 25b has a respective leg 29a, 29b depending from its lower end. As best shown in FIG. 4, legs 29a, 29b are spaced from one another and are substantially parallel. These legs are intended to be substantially parallel to the longitudinal axis CA of the motor M when the brackets are installed on the motor and to extend in fore and aft direction on the exterior of shell 9 of the motor. Each leg 29a, 29b has a respective hook-shaped foot 31a, 31b (see FIG. 2) which extends down from the free end of its respective leg and which extends back toward main body 25 below its respective leg. As shown in FIG. 1, feet 31a, 31b are adapted for insertion into respective apertures 19 provided in end shield 11a, 11b and the brackets must be normally stretched, flexed or otherwise resiliently deformed so as to expand dimension A (see FIG. 2) whereby feet 31a, 31b may be fitted into apertures 19. With feet 19 received in their respective apertures, the shape of bracket 23 is such that the feet are resiliently retained in position on the motor upon release of the bracket and legs 29a, 29b are spaced apart from one another and their bottoms engage shell 9 so as to effectively prevent them from rotating about their feet on the motor. Even more specifically, with brackets 23 snapped into place, the normal (or as-formed) shape of the brackets is such that the ends of main body portions 25a, 25b are resiliently forced downwardly into engagement with shell 9 and feet 31a, 31b are resiliently forced radially outwardly into firm engagement with the portion of end shields 11a, 11b defining aperatures 19.

As best shown in FIG. 1, a number of different apertures 19 are die cast into end shields 11a, 11b so as to position brackets 23 at different desired locations on the motor. Thus, by providing brackets 23 having body portions 25a, 25b of different lengths and positioned at various locations along the length of the shell and inclined at different angles with respect to the central axis CA of the motor, and by inserting the feet of the brackets in various aperatures 19, it is possible to mate loops 27 of these brackets with virtually any desired support structure S to which the motor is to be mounted.

In certain instances, it is desirable to provide a grommet 33 of elastomeric material in loop 27. The grommet has an opening therethrough for reception of a fastener F (e.g., a bolt) which in turn is secured to support S. This provides for a cushion mounting for the motor for purposes as will appear. Also, various spacers may be placed between the loop and the support for shimming the motor to a desired position.

The embodiment of this invention, as heretofore indicated by reference character 7 and as shown in FIGS. 11-13, is a variation of bracket 23 and is indicated at 23'. Briefly, this other bracket 23' is essentially similar to bracket 23 described above except that its legs 29a' and 29b' angle inwardly so that its feet 31a', 31b' are in line with one another and are substantially co-axial (see FIG. 13). Thus, with wire brackets 23' stretched open and snapped into position on motor M with their feet 31a, 31b received and substantially co-axial aperatures 19 in end shields 11a, 11b, the bracket feet are substantially co-axial with one another and thus the bracket is free to rotate about an axis common to both of its feet between a folded or stowed position (not shown) in which the bracket is folded in on the motor adjacent shell 9 for compact packaging of the motor during shipping to an extended position similar to the position of brackets 23 shown in FIG. 11 in which the brackets extend outwardly from the shell of the motor for securement of the motor to support S. As mentioned above in regard to bracket 23, modified bracket 23' has its main body portions 25a', 25b' and its loop 27' disposed in a plane which is inclined with respect to central axis CA of motor M.

In FIGS. 5-7, embodiment 3 of the motor mounting system of this invention is shown. This system includes the provision of a plurality (e.g., three) of formed wire brackets, each of which is generally indicated at 35. Brackets 35 are similar in many respects to brackets 23 and 23' heretofore described in that they have side-by-side main body portions 37a, 37b, a loop 39 interconnecting the outer ends of the main body portions, legs 41a, 41b depending from the inner ends of their respective main body portions, and feet 43a, 43b extending from the legs. As best shown in FIGS. 6 and 7, feet 43a, 43b project toward one another and are in line (i.e., co-axial) with one another. Thus bracket 35 is rotatable about the axis common to both of its feet 43a, 43b when the bracket is installed on the motor. Also, body portions 37a, 37b and loop 39 are substantially coplanar and the plane of these portions of the bracket is inclined with respect to a plane perpendicular to the central axis CA of motor M.

This last-mentioned mounting system further includes an attachment or securement plate, as generally indicated at 45, adapted to be secured (e.g., welded or bolted) to the outer surface of cylindric shell 9 of motor M. As shown, attachment plate 45 is a rectangular member made of sheet metal or the like having a central longitudinal protrusion 47 formed thereon. Plate 45 is curved to the curvature of the shell and is oriented on the shell so that the axis of its protrusion 47 is substantially parallel to central axis CA of motor M. Preferably, the connector plate is welded to the outer cylindric surface of shell 9. The inner surface of protrusion 47 at the ends there of cooperates with the outer surface of shell 9 so as to form apertures, as indicated at 19', for reception of feet 43a, 43b of bracket 35 (see FIGS. 5 and 6). Thus, brackets 35 may be swung between a folded position adjacent the shell of the motor and an extended motor mounting position. Furthermore, by elastically deforming the brackets (i.e., by stretching the bracket in fore and aft direction), feet 43a, 43b may be readily inserted in or removed from apertures 19' in attachment plate 45. Thus, motor M may be compactly shipped with attachment plates 45 welded to its outer shell but with brackets 35 removed therefrom, and the brackets may be subsequently readily installed simply by snapping them into place. Alternatively, motor M may be shipped with the motor mounting brackets 35 installed thereon, but folded to their stowed position for compact shipping of the motors and then extended to their desired motor mounting positions upon installation of the motor in an appliance. Like brackets 23', brackets 35 may be rotated on shell 9 so as to mate with various bolt holes on various bolt circle diameters.

In FIGS. 8-10, embodiment 5 of the motor mounting system of this invention is shown. More specifically, this embodiment includes the provision of a plurality of formed wire brackets, as generally indicated at 47, secured (e.g., welded) to shell 9 of motor M at substantially equal angular intervals therearound. Each bracket 47 includes a foot 49 securable to the motor shell and further has a main body portion 51 angling outwardly from the shell at one end of the foot. A loop 53 is formed at the outer end of body portion 51. As shown in FIG. 9, body portion 51 and loop 53 are coplanar and their common plane is inclined with respect to a plane perpendicular to the central axis CA of the motor.

As mentioned above in regard to the various embodiments 1, 3, 5 and 7 of the mounting system of this invention, the plane of their main body portions and their respective loops is inclined with respect to a plane perpendicular to the central axis CA of the motor M on which they are installed. With three of the brackets of the various motor mounting systems of this invention secured to a motor as above described, the main body portions of the brackets form a conical shaped mounting structure for the motor. Also, with fasteners F installed through the loops of the various brackets, the fasteners are inclined with respect to central axis CA of the motor. Thus, any axial force applied to motor M results in a shear load being applied to fasteners F and in an axial compression or tension load applied to the main body portions of the brackets. The brackets are, of course, relatively stiff in axial tension and compression loading so that the motor is substantially rigidly mounted on the support so as to rigidly resist axial loading. Grommets 33, as described above, may be installed in the loops of any of the brackets and these elastomeric grommets allow some give in the mounting brackets so as to somewhat cushion the motor against axial loading. It will be further noted, that the use of grommets 31 is optional and, in certain applications, fasteners F may be secured directly to the brackets so as to rigidly and solidly secure the motor to support structure S. If desired, the loops of the various brackets of the mounting system of this invention may be coated with a suitable material, such as a vinyl plastic, so as to provide a limited amount of cushioning without requiring the use of separate rubber grommets.

Further in accordance with this invention, it will be noted that the various mounting brackets of this invention secure motor M to support structure S so as to resist side loads applied to the motor (as by a pulley belt, for example) and to resist rotation of the motor. However, the various brackets are so structured so as to be somewhat flexible due to their formed wire construction when subjected to side and rotational loading. Accordingly, the mounting systems of this invention do permit a limited amount of sideward or rotational movement of the motor when the latter is subjected to side or rotational loading. Thus, the mounting systems of this invention substantially rigidly secure the motor against movement in axial direction and yet permit limited, cushioned (or resilient) movement of the motor in one or more other directions (i.e., in sideways or rotational direction).

It will be appreciated that means other than apertures 19 and 19' on motor M may be provided for the securement of the mounting brackets of this invention to motor M. For example, outwardly projecting beads (not shown) may be formed in shell 9 to extend longitudinally of the shell with the feet of various mounting brackets being arranged to fit closely in these beads. A metal strap or the like may be then securely tightened around the shell so as to hold the bracket feet captive between the beads. Thus, the beads and strap cooperate to form aperatures on the motor similar in function to aperatures 19, 19', as above described. Of course, the end of the bracket foot on the side of the strap opposite the main body of the bracket may be formed to extend out from shell 9 so as to engage the strap and to retain the bracket in place. A variation of this last-mentioned bracket securement means may also involve the provision of a first circumferential strap (not shown) secured in place around the motor shell. This first strap is provided with a pair of outwardly projecting protrusions extending therefrom for each bracket to be secured. These protrusions are spaced from one another a distance only slightly greater than the thickness of the bracket feet and a second or outer strap is secured around the outside of the first strap so as to hold the bracket feet captive in aperatures formed between the straps and between the protrusions. Also, protruding bosses (not shown) may be die cast in place on end shields 11a, 11b for receiving the bracket feet in place of aperatures of 19. Still further, other straps may be used having outwardly projecting beads formed therein so that when these straps are applied to shell 9, the beads together with the shell define aperatures for receiving the feet of the brackets.

With either brackets 35 and 23' as shown in FIGS. 5-7 and 11-13, respectively, installed on the motor M, it will be understood that the brackets are freely rotatable on the motor about the common axis of their coaxial feet. By rotating the brackets on the motor, their respective loops 39 and 27' may be infinitely adjusted to mate up with any bolt circle dimensions for support structure S within a limited range.

It will be appreciated that by merely supplying mounting brackets, as described above, of selected sizes and configurations, one size or model of electric motor M can readily be used for many different applications thus eliminating the need to inventory several variations of a single motor differing in the configuration of their mounting brackets.

In FIG. 14, a modification of bracket 23 is shown, this modification being designated 23". As shown loop 27" of this modified bracket is so formed as to have an inner loop or fastener receiving portion, and an outer loop or fastener receiving portion as indicated at 101 and 103, respectively. Thus, bracket 27" is particularly well-suited to be bolted to structure S on either an inner bolt circle which mates with inner loop 101 or with air outer bolt circle which mates with outer loop 103 of brackets 27" secured to motor M.

In FIG. 15, a modification of bracket 23 is shown in which feet 31a and 31b of the bracket have retainers 105 formed on the ends of the feet so as to extend outwardly, these retainers being engageable with the inner face of their respective end shields 11a, 11b. For use with the above-described brackets having retainer 105, the aperatures in the end shields have been modified, as indicated at 19', so as to freely receive feet 31a, 31b with retainers 105 thereon. These modified aperatures are substantially larger than the diameter of the wire from which bracket 23 is made and may be a circular hole, an elongate slot, or other configuration sized to receive the bracket foot as stated heretofore in regard to brackets 23 and 23', the bracket feet are biased outwardly to bear against the outer edges of aperatures 19' and thus are firmly held in place on the motor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for mounting an electric motor or the like to a support, said motor having a central longitudinal axis extending in fore and aft direction, said motor having a plurality of apertures therein, said mounting means comprising a plurality of brackets adapted to be secured to said motor at intervals spaced therearound, each of said brackets being formed of relatively stiff wire or the like and having a portion extending outwardly from said motor and a loop at the outer end of the bracket, said loop facing in generally fore and aft direction with respect to the motor and being adapted to receive a fastener for securing the motor to said support, each of said brackets comprising a pair of said body portions with said loop joining said body portions, and, further, each of said brackets having a foot extending therefrom in a direction generally parallel to said central axis of said motor when said bracket is installed on said motor with one of said feet extending in fore direction and the other of said feet extending in aft direction, said feet being adapted to be received in said apertures in said motor for securement of said bracket to the motor.

2. A system as set forth in claim 1 wherein said motor has a cylindric shell and an end shield secured to each end of said shell, at least one of said end shields having one or more of said apertures therein, said feet being adapted for insertion in a respective aperture on said end shield.

3. A system as set forth in claim 2 wherein said feet are hook-shaped with the free end of said feet extending generally parallel to said central axis of said motor when installed on said motor back toward said body portions.

4. A system as set forth in claim 1 wherein said motor has a cylindric shell, the latter having a plurality of bracket securement members rigidly secured to the outer surface thereof at intervals spaced therearound, each of securement members having two of said apertures for receiving the feet of a respective bracket.

5. A system as set forth in claim 4 wherein each of said securement members comprises a sheet metal plate shaped to conform to the outer cylindric surface of said shell, said plate having an outwardly protruding portion at the front and rear ends thereof, said outwardly protruding portions cooperating with said shell to form said apertures for receiving the feet of said bracket.

6. A system as set forth in claim 1 wherein said brackets are formed of relatively stiff, resilient wire and are so structured as to resiliently bias said feet into said apertures.

7. A system as set forth in claim 1 wherein said feet of a respective bracket are substantially coaxial when installed on said motor thereby to permit rotation of said bracket about an axis common to both of said feet for swinging movement of the bracket on the motor between a stowed position adjacent the shell of the motor so as to permit compact shipping of the motor and a motor securing position.

8. A system as set forth in claim 1 wherein said loop is disposed in a plane inclined with respect to a plane perpendicular to said central axis of said motor.

9. A system as set forth in claim 8 wherein each of said brackets has a pair of said body portions, and wherein said loop and at least one of said body portions are coplanar.

10. A systems as set forth in claim 1 further comprising a grommet of elastomeric material or the like disposed within said loop, said grommet having an opening therethrough for reception of a fastener thereby to secure said motor to said support.

11. A one-piece mounting bracket for an electric motor or the like of relatively stiff, resilient formed wire construction, said bracket including a pair of generally side-by-side body portions, the outer ends of said body portions being joined by a loop, each of said body portions having a foot at its end opposite said loop extending in generally axial direction with respect to said motor when said bracket is installed thereon with one of said feet extending in one axial direction and with the other of said feet extending in the opposite axial direction, said motor having a plurality of apertures therein, each of the feet of a respective bracket being adapted to be inserted in a respective aperture for securement of said bracket to said motor, said loop being adapted to receive a fastener for securement of said motor to a support, such as to the frame of an appliance or the like.

12. A mounting bracket as set forth in claim 11 wherein each of said feet is connected to its respective body portion by a leg.

13. A mounting bracket as set forth in claim 11 wherein said each of said brackets is so structured that it must be elastically deformed for insertion of its said feet into said apertures whereby said bracket resiliently retains said feet in said apertures.

14. A mounting bracket as set forth in claim 11 wherein said loop faces generally in fore and aft direction with respect to said motor when said bracket is installed on said motor, and wherein said loop is disposed in a plane which is inclined with respect to a plane perpendicular to the longitudinal axis of said motor.

15. A mounting bracket as set forth in claim 13 wherein said feet are substantially coaxial whereby said bracket may be rotated with respect to said motor about the common axis of said feet.

16. A mounting bracket as set forth in claim 13 wherein said feet are spaced in side-by-side relation from one another so that with said feet received in said apertures in said motor, rotation of said bracket about an axis parallel to the longitudinal axis of said motor is substantially prevented.

17. A system for mounting an electric motor to a support, such as to the structure of an appliance or the like, said motor having a cylindric shell and a central longitudinal axis extending in fore and aft direction with respect to said shell, said system comprising three one-piece mounting brackets made of relatively stiff, resilient wire, said mounting brackets being securable to said shell at intervals around the circumference of said shell, each of said mounting brackets having a pair of substantially side-by-side main body portions adapted to extend from said shell when said bracket is in its mounting position installed on the motor, a loop connecting the outer ends of said body portions, and a foot extending in fore or aft direction from the inner end of each of said body portions, said motor being provided with a plurality of apertures for receiving said feet thereby to secure said brackets to said motor.

18. A one-pieced formed wire bracket for mounting an electric motor or the like to a support, such as to the frame of an electrical appliance, said motor having a generally cylindric shell, an end shield secured to the shell at each end thereof, one or more apertures in each of said end shields, and a central longitudinal axis extending in fore and aft direction with respect to said motor, said bracket having a pair of generally side-by-side main body portions, a loop interconnecting the outer ends of said main body portions, a first foot extending from the inner end of one of said main body portions in one axial direction with respect to said motor and a second foot extending from the inner end of the other of said main body portions in opposite axial direction to said first foot, said loop being adapted to receive a fastener for securing said bracket to said support and being disposed in a plane inclined with respect to the plane of the longitudinal axis of said motor, said feet being received in said apertures provided in said end shields for securement of said bracket to said motor, said bracket being of relatively stiff, resilient wire and being so structured as to require elastic deformation thereof for insertion of said feet into said apertures and further being so structured as to resiliently hold said feet in said apertures.

19. A bracket as set forth in claim 18 wherein said feet are substantially coaxial so as to permit rotation of said bracket relative to said motor about an axis common to the feet of said bracket.

20. A bracket as set forth in claim 18 wherein said feet are spaced from one another in side-by-side relation when secured to said motor thereby to prevent rotation with respect to said motor.

21. A one-piece formed wire bracket and attachment plate for mounting an electric motor within an appliance, said motor having a cylindric shell and a longitudinal central axis extending in fore and aft direction with respect to said motor, said bracket being formed of relatively stiff, resilient wire and having two generally side-by-side body portions, a loop interconnecting the outer ends of said body portions, a first foot extending from the inner end of one of said body portions in one direction generally parallel to said central axis when said bracket is secured to said motor, the other of said body portions having a leg extending therefrom generally in said one axial direction, said leg being spaced from said shell and having a second foot depending therefrom in generally opposite axial direction to said first foot, said feet being generally coaxial and opposing one another;

said attachment plate being formed to fit on said cylindric shell and being adapted to be secured thereto, said plate further having a longitudinal protrusion extending outwardly from the surface of said shell with the space between said shell on the inside of said protrusion at each end of the plate constituting an aperture for reception of one of said feet, said bracket being so structured as to be resiliently and elastically deformed for insertion of said feet into their respective apertures and for resiliently biasing said feet into their respective apertures.

22. A system for mounting an electric motor or the like to a support, said motor having a central longitudinal axis extending in fore and aft direction, said mounting means comprising a plurality of brackets adapted to be secured to said motor at intervals spaced therearound, each of said brackets being formed of relatively stiff wire or the like and having a portion extending outwardly from said motor and a loop at the outer end of the bracket, said loop facing in generally fore and aft direction with respect to the motor and being adapted to receive a fastener for securing the motor to said support, said loop having an inner fastener receiving portion and an outer fastener receiving portion whereby said loop may be readily mated to either an inner or an outer fastener pattern on said support.

23. A system as set forth in claim 3 wherein said feet have their free ends so formed as to extend outwardly for engagement with the inner side of their respective end shields so as to retain said feet in said aperatures.

24. A mount for securing an electric motor or the like to a support, said motor having a cylindrical shell and a longitudinal central axis extending in generally fore and aft direction with respect to the motor, said mount comprising a bracket and a mounting member for each of said brackets, each of said mounting members being adapted to be welded on the exterior of said shell, each said bracket having one of its ends constituting its inner end rotatably coupled with said mounting member and having its other or outer end adapted to receive a fastener for securing said bracket to said support, said bracket being rotatable with respect to said mounting member between a folded position in which said bracket lies generally proximate the shell of said motor and an extended position in which the bracket extends generally radially outwardly from the motor for securement to said support.

25. A mount as set forth in claim 24 wherein said mounting member is oriented with respect to said motor so that its longitudinal axis is generally parallel to the longitudinal central axis of the motor.

26. A mount as set forth in claim 25 wherein the outer end of said bracket is generally planar, and wherein said planar outer end of said bracket faces in generally fore and aft direction with respect to motor.

27. A mount as set forth in claim 26 wherein with said bracket in its extended position, said planar, outer end of said bracket is disposed in a plane which is inclined with respect to a plane perpendicular to the longitudinal axis of said motor.

28. A mount for securing an electric motor or the like to a support, said motor having a cylindrical shell, said mount comprising a bracket and means for pivotally mounting said bracket for swinging between a folded position in which said bracket is proximate said shell and an extended position in which said bracket extends generally outwardly from said shell for securement to said support, said pivotal mounting means comprising a pair of feet on said bracket, said motor having apertures therein for receiving said bracket feet, said bracket feet when received in said apertures enabling pivotal movement of said bracket between its folded and extended positions.

29. A mount for securing an electric motor or the like to a support, said motor having a cylindrical shell, said mount comprising a bracket and means for pivotally mounting said bracket for swinging between a folded position in which said bracket is proximate said shell and an extended position in which said bracket extends generally outwardly from said shell for securement to said support, said pivotal mounting means comprises a pair of feet on said bracket, and wherein said mount further comprises means for holding said feet captive on the exterior of said shell so as to enable swinging of said bracket between its folded and extended positions.

30. A mount as set forth in claim 29 wherein said holding means comprises a holding member secured to said shell and cooperable therewith so as to hold said feet captive on the exterior of said shell.

31. A mount as set forth in claim 30 wherein said holding means comprises a sheet metal member shaped to conform to said shell, said sheet metal member and said shell being so structured as to form apertures for receiving said feet and for holding said feet captive.

32. A mount as set forth in claim 31 wherein said shell has a pair of outwardly protruding beads formed in said shell for each of said feet, said pair of beads being arranged to fit closely between said beads, and wherein said sheet metal member is a strap which is adapted to fit securely around said shell and to hold said feet captive between said beads.

33. A mount as set forth in claim 31 wherein said sheet metal member comprises a strap adapted to encircle and to conform to said shell, said strap having a pair of protruding protrusions thereon for each of said bracket feet, said protrusions being spaced apart so that a respective bracket foot fits closely therebetween, said strap with said protrusions thereon cooperating with said shell so as to hold said feet captive.

34. A mount as set forth in claim 31 wherein said sheet metal member comprises a first or outer strap adapted to encircle and to be drawn tightly on said shell, and wherein said mount further comprises a second or inner strap adapted to encircle said shell and to be disposed between said shell and said strap, one of said straps having a pair of spaced protrusions thereon for each of said bracket feet, said protrusions and the other of said straps cooperating to hold said feet captive.

* * * * *